United States Patent Office.

THOMAS L. UPTON, OF FARMINGTON, WEST VIRGINIA.

Letters Patent No. 63,965, dated April 16, 1867.

MEDICAL VEGETABLE LINIMENT.

*The Schedule referred to in these Letters Patent and making part of the same.*

TO ALL WHOM IT MAY CONCERN:

Be it known that I, THOMAS L. UPTON, of Farmington, in the county of Marion, and State of West Virginia, have invented a new and useful Medical Vegetable Liniment; and I do hereby declare that the following is a full and accurate description of the materials constituting my liniment, and the mode of compounding the same.

To enable others skilled in the art to compound and use my invention, I will proceed to enumerate the ingredients of which my liniment is composed, and the mode of compounding them.

Add to one quart of linseed oil one quart of the oil of spike, one quart of the spirits of turpentine, one quart of alcohol, one quarter of a pound of gum myrrh, one ounce of gum camphor, and one ounce of capsicum. The myrrh must be well dried and finely pulverized, and, with the camphor and capsicum, put in the alcohol and allowed to remain eight or ten days at a temperature of about 90° Fahrenheit, taking care to agitate it two or three times each day; then add the other liquid ingredients, and shake the whole well together.

My liniment is of great efficacy in the relief of sprains and bruises, in the cure of cuts and wounds, in relaxing rigid muscles, or in invigorating numbness of the muscles; it will relieve cramps and rheumatism, and is especially useful in curing sore throat.

What I claim as my invention, and desire to secure by Letters Patent, is—

The liniment consisting of the ingredients named, in about the proportions specified, and compounded substantially as and for the purpose set forth.

In testimony whereof I have hereunto subscribed my name.

THOMAS L. UPTON.

Witnesses:
 T. A. MAULSBY,
 JAS. O. WATSON.